(12) United States Patent
Jinnai et al.

(10) Patent No.: US 10,464,112 B2
(45) Date of Patent: Nov. 5, 2019

(54) ENERGY-SAVING CONTROL DEVICE FOR ROLLING LINE

(71) Applicant: TOSHIBA MITSUBISHI-ELECTRIC INDUSTRIAL SYSTEMS CORPORATION, Chuo-ku (JP)

(72) Inventors: Hiroyuki Jinnai, Tokyo (JP); Hiroyuki Imanari, Tokyo (JP); Naoki Shimoda, Tokyo (JP); Kazutoshi Kitagoh, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 578 days.

(21) Appl. No.: 14/758,673

(22) PCT Filed: Feb. 4, 2013

(86) PCT No.: PCT/JP2013/052495
§ 371 (c)(1),
(2) Date: Jun. 30, 2015

(87) PCT Pub. No.: WO2014/118989
PCT Pub. Date: Aug. 7, 2014

(65) Prior Publication Data
US 2015/0352612 A1 Dec. 10, 2015

(51) Int. Cl.
*B21B 37/00* (2006.01)
*G05B 13/02* (2006.01)

(52) U.S. Cl.
CPC ............ *B21B 37/00* (2013.01); *G05B 13/021* (2013.01); *G05B 2219/32021* (2013.01);
(Continued)

(58) Field of Classification Search
CPC ................. Y02P 90/205; Y02P 70/161; G05B 2219/32021
(Continued)

(56) References Cited

U.S. PATENT DOCUMENTS

| 4,606,006 A | * | 8/1986 | Kitao et al. .................. 364/472 |
| 2012/0004757 A1 | * | 1/2012 | Imanari .................. B21B 37/74 700/104 |

FOREIGN PATENT DOCUMENTS

| CN | 102348516 A | 2/2012 |
| CN | 102641904 A | 8/2012 |

(Continued)

OTHER PUBLICATIONS

Office Action dated Apr. 26, 2016 in Japanese Patent Application No. 2014-559475 with partial English translation.
(Continued)

*Primary Examiner* — Emilio J Saavedra
(74) *Attorney, Agent, or Firm* — Oblon, McClelland, Maier & Neustadt, L.L.P.

(57) ABSTRACT

An energy-saving control device for a rolling line, the energy-saving control device capable of finding rolling conditions for minimizing energy consumption for the rolling line while ensuring a quality of a product. The energy-saving control device for a rolling line includes: an energy consumption estimating unit that calculates energy consumption for the rolling line based on rolling conditions for the rolling line; and an energy consumption optimizing unit that changes a rolling condition other than a target temperature of a material to be rolled, as a manipulation item so that the energy consumption calculated by the energy consumption estimating unit is reduced while a quality of a product formed by rolling the material to be rolled is ensured.

9 Claims, 9 Drawing Sheets

(52) U.S. Cl.
CPC ............ *Y02P 70/161* (2015.11); *Y02P 80/114* (2015.11); *Y02P 90/205* (2015.11)

(58) Field of Classification Search
USPC ........................................................ 700/150
See application file for complete search history.

(56) References Cited

FOREIGN PATENT DOCUMENTS

| | | | | | |
|---|---|---|---|---|---|
| JP | 61082913 A | * | 4/1986 | ............ | B21B 37/52 |
| JP | 2001-314910 A | | 11/2001 | | |
| JP | 2001314910 A | * | 11/2001 | | |
| JP | 2005-048202 A | | 2/2005 | | |
| JP | 2012-170962 A | | 9/2012 | | |
| JP | 2012-170963 A | | 9/2012 | | |
| JP | 2012170962 A | * | 9/2012 | | |
| WO | WO 2010/103659 A1 | | 9/2010 | | |

OTHER PUBLICATIONS

Combined Chinese Office Action and Search Report dated Mar. 23, 2016 in Patent Application No. 201380072214.3 (with partial English language translation and English language translation of categories of cited documents).
International Preliminary Report on Patentability and Written Opinion dated Aug. 13, 2015 in PCT/JP2013/052495 (submitting English translation only).
International Search Report dated Apr. 9, 2013, in PCT/JP2013/052495, filed Feb. 4, 2013.
Indian Office Action dated Mar. 7, 2019 in Indian Patent Application No. 5701/DELNP/2015 (with English translation), 6 pages.

\* cited by examiner

ENERGY-SAVING CONTROL DEVICE FOR ROLLING LINE

TECHNICAL FIELD

This invention relates to an energy-saving control device for a rolling line.

BACKGROUND ART

Energy-saving control devices that reduce energy consumption for a rolling line by changing a target temperature of a material to be rolled have been proposed. Such energy-saving control devices can minimize energy consumption for a rolling line (see, for example, Patent Literature 1).

CITATION LIST

Patent Literature

Patent literature 1: International Publication No. 2010/103659
Patent literature 2: Japanese Patent Laid-Open No. 2005-48202
Patent literature 3: Japanese Patent Laid-Open No. 2001-314910

SUMMARY OF INVENTION

Technical Problem

However, the one described in Patent Literature 1 may fail to ensure a quality of a product as a result of the target temperature change. In this case, spent energy and costs are wasted.

This invention has been made in order to solve the aforementioned problem, and an object of this invention is to provide an energy-saving control device for a rolling line, the energy-saving control device capable of finding rolling conditions for reducing energy consumption for the rolling line while ensuring a quality of a product.

Means for Solving the Problems

A energy-saving control device for rolling line of the present invention includes an energy consumption estimating unit that calculates energy consumption for the rolling line based on rolling conditions for the rolling line; and an energy consumption optimizing unit that changes a rolling condition other than a target temperature of a material to be rolled, as a manipulation item so that the energy consumption calculated by the energy consumption estimating unit is reduced while a quality of a product formed by rolling the material to be rolled is ensured.

Advantageous Effect of Invention

This invention enables finding rolling conditions for reducing energy consumption for a rolling line while ensuring a quality of a product.

DESCRIPTION OF EMBODIMENTS

Embodiments of this invention will be described with reference to the accompanying drawings. In the drawings, parts that are the same or correspond to each other are provided with a same reference numeral, and overlapping description thereof will arbitrarily be simplified or omitted.

Embodiment 1

Figure 1:
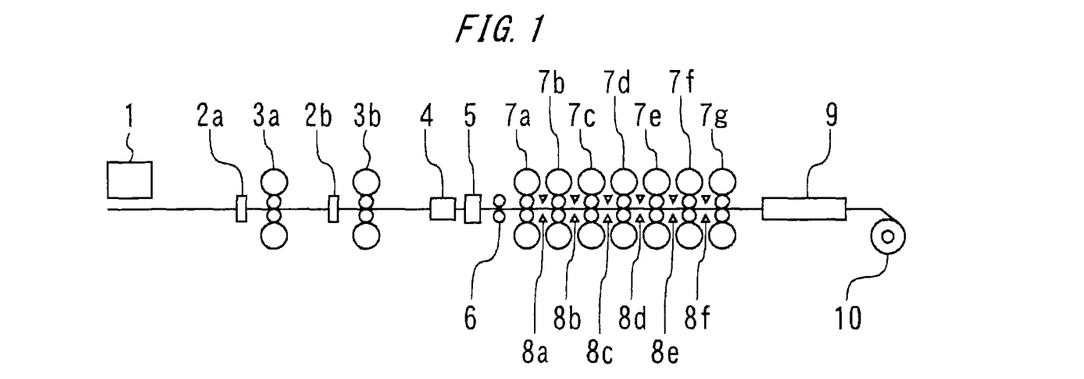
FIG. 1 is a diagram of a configuration of a hot sheet rolling line for an iron steel using an energy-saving control device for a rolling line according to Embodiment 1 of this invention.

FIG. 1 is a diagram of a configuration of a hot sheet rolling line for an iron steel using an energy-saving control device for a rolling line according to Embodiment 1 of this invention.

In FIG. 1, in a heating furnace 1, a columnar skid (not illustrated) is provided. On the downstream side of the heating furnace 1, a first edger 2a is provided. On the downstream side of the first edger 2a, a first roughing stand 3a is provided. On the downstream side of the first roughing stand 3a, a second edger 2b is provided. On the downstream side of the second edger 2b, a second roughing stand 3b is provided. On the downstream side of the second roughing stand 3b, a bar heater 4 is provided. On the downstream side of the bar heater 4, an edge heater 5 is provided. On the downstream side of the edge heater 5, a crop shear 6 is provided. On the downstream side of the crop shear 6, first to seventh finishing stands 7a to 7g are provided.

A first cooling spray 8a is provided between the first finishing stand 7a and a second finishing stand 7b. A second cooling spray 8b is provided between the second finishing stand 7b and a third finishing stand 7c. A third cooling spray 8c is provided between the third finishing stand 7c and a fourth finishing stand 7d. A fourth cooling spray 8d is provided between the fourth finishing stand 7d and a fifth finishing stand 7e. A fifth cooling spray 8e is provided between the fifth finishing stand 7e and a sixth finishing stand 7f. A sixth cooling spray 8f is provided between the sixth finishing stand 7f and the seventh finishing stand 7g.

On the downstream side of the seventh finishing stand 7g, a run-out table 9 is provided. In the run-out table 9, a water injection facility (not illustrated) is provided. On the downstream side of the run-out table 9, a down toiler 10 is provided.

On the hot sheet rolling line, a rectangular parallelepiped slab is loaded on the skid in the heating furnace 1 as a material to be rolled. The slab has a thickness of around 250 mm. The slab is transported by the skid. Here, the heating furnace 1 converts a fuel to thermal energy. The slab is heated to around 1200° C. by the thermal energy. Here, the skid is cooled by water. A surface temperature of the skid is decreased by the cooling. As a result, a temperature of a part of the slab that is in contact with the skid decreases.

Subsequently, the slab is extracted from the heating furnace 1. Then, the slab is transported to the first edger 2a. Here, the first edger 2a converts power to rotation energy. The first edger 2a rolls the slab in a sheet width direction by the rotation energy. In other words, the first edger 2a adjusts a sheet width of the slab. Then, the slab is transported to the first roughing stand 3a. Here, the first roughing stand 3a converts power to rotation energy. The first roughing stand 3a rolls the slab in a sheet thickness direction by the rotation energy. In other words, the first roughing stand 3a adjusts a sheet thickness of the slab.

Subsequently, the slab is transported to the second edger 2b. Here, the second edger 2b converts power to rotation energy. The second edger 2b rolls the slab in the sheet width direction by the rotation energy. In other words, the second edger 2b adjusts the sheet width of the slab. Then, the slab is transported to the second roughing stand 3b. Here, the second roughing stand 3b converts power into rotation energy. The second roughing stand 3b rolls the slab in the sheet thickness direction by the rotation energy. In other words, the second roughing stand 3b adjusts the sheet thickness of the slab.

In each of the first roughing stand 3a and the second roughing stand 3b, mill rolls (not illustrated) repeats normal rotation and reverse rotation. In other words, a roll pass is repeated a plurality of times. As a result, the slab becomes a bar having a thickness of around 30 to 50 mm.

Subsequently, the bar is transported on a table (not illustrated) toward the first finishing stand 7a. Here, the tail end side of the bar is left in an atmosphere for a long time relative to the head end side of the bar. As a result, a thermal rundown may occur. In other words, a temperature of the tail end side of the bar may become lower than a temperature of the head end side of the bar.

Here, the bar heater 4 converts power to thermal energy by means of an induction heating coil (not illustrated). The bar heater 4 heats an entirety in a width direction of the bar by the thermal energy. Thermal rundown is suppressed by the heating. Here, temperature variation in skid marks is also suppressed. As a result, a temperature distribution in the bar becomes uniform.

Subsequently, the bar is transported to the edge heater 5. In the transportation, temperatures of end portions in the width direction of the bar may decrease. Here, the edge heater 5 converts power to thermal energy by means of an induction heating coil (not illustrated). The edge heater 5 heats only the end portions in the width direction of the bar by means of the thermal energy. A decrease in temperature of the end portions in the width direction of the bar is suppressed by the heating.

Subsequently, the bar is transported to the crop shear 6. Here, the crop shear 6 cuts head and tail end portions of the bar. As a result of the cutting, the head and tail end portions of the bar are shaped. As a result, favorable threading performance of the bar is ensured.

Subsequently, the bar is rolled so as to have a desired thickness by the first to seventh finishing stands 7a to 7g. For example, the bar is rolled until the bar has a thickness in a range of 1.2 to 25.0 mm. Here, the temperature distribution of the bar remains uniform. Thus, breaking of the end portions in the width direction of the bar is suppressed. Also, in mill rolls (not illustrated) in the first to seventh finishing stands 7a to 7g, an increase in local abrasion is suppressed.

In the rolling via the first to seventh finishing stands 7a to 7g, the first to sixth cooling sprays 8a to 8f spray cooling water to the material to be rolled. The temperature of the material to be rolled is adjusted by the spraying.

Subsequently, the material to be rolled is transported to the downstream side by the run-out table 9. Here, the material to be rolled is cooled by water via the water injection facility in the run-out table 9 until the material to be rolled reaches a desired temperature. Subsequently, the material to be rolled is wound up by the down coiler 10. As a result, the material to be rolled becomes a coiled product.

The hot sheet rolling line is automatically run by a computer control system with the aid of an operator. In the computer control system, a hierarchical structure of levels 0 to 2 is employed.

Units of level 0 include, e.g., a motor drive unit (not illustrated) and a hydraulic control unit (not illustrated). For example, the motor drive unit supplies a fixed voltage having a commercial frequency to motors (rotary machines) (not illustrated) of the first roughing stand 3a, etc. As a result of the supply, each of the motors is driven at a fixed velocity. For example, the motor drive unit changes at least one of a voltage and a frequency of the voltage using a frequency conversion unit (not illustrated) such as an inverter, to supply the resulting voltage to each motor. As a result of the supply, each motor is driven at a desired rotation velocity. The hydraulic control unit controls a position and a pressure of a hydraulic machinery (not illustrated).

A unit of level 1 is a PLC (programmable logic controller) (not illustrated). The PLC controls the units of level 0 in real-time at high speed. More specifically, the PLC performs, e.g., feed forward control based on estimated values and feedback control based on measured values from sensors (not illustrated) so that a product has a high quality through an entire length thereof.

Units of levels 2 are setting calculation units such as a process computer (not illustrated in FIG. 1). The setting calculation unit performs, e.g., setting calculation and data management. More specifically, the setting calculation unit obtains information on a raw material of a material to be rolled and a product from the outside. Before the material to be rolled reaches the first edger 2a, the first roughing stand 3a, the second edger 2b, the second roughing stand 3b and the first to seventh finishing stands 7a to 7g, the setting calculation unit calculates initial values to be provided to the PLC, based on, e.g., a rolling model. The initial values are calculated so that the material to be rolled can stably pass through the first roughing stand 3a, etc. and the material to be rolled can be controlled with good accuracy from a head end thereof.

For example, the setting calculation unit calculates mill roll gaps, mill roll speeds and flow rates of the first to sixth cooling sprays 8a to 8f. For example, the setting calculation unit calculates a mass of a slab, a target extraction temperature of the slab, power to be supplied to the bar heater 4, power to be supplied to the edge heater 5, a rolling torque at a representative point of the material to be rolled, and rolling time.

For example, in rough setting calculation relating to the first edger 2a, the first roughing stand 3a, the second edger 2b and the second roughing stand 3b, the setting calculation unit calculates the number of roll passes to obtain a bar from the slab, and a draft schedule (pass schedule) on sheet thicknesses and sheet widths in the respective passes. Here, the pass schedule is calculated based on allocation of e.g., draft amounts and power in the respective passes.

For example, in finishing setting calculation relating to the first to seventh finishing stands 7a to 7g, the setting calculation unit calculates a sheet thickness schedule for the first to seventh finishing stands 7a to 7g based on a designated load allocation method. Here, the sheet thickness schedule is calculated based on, e.g., a rolling load ratio, power and a draft.

Next, the energy-saving control device will be described with reference to FIG. 2.

Figure 2:
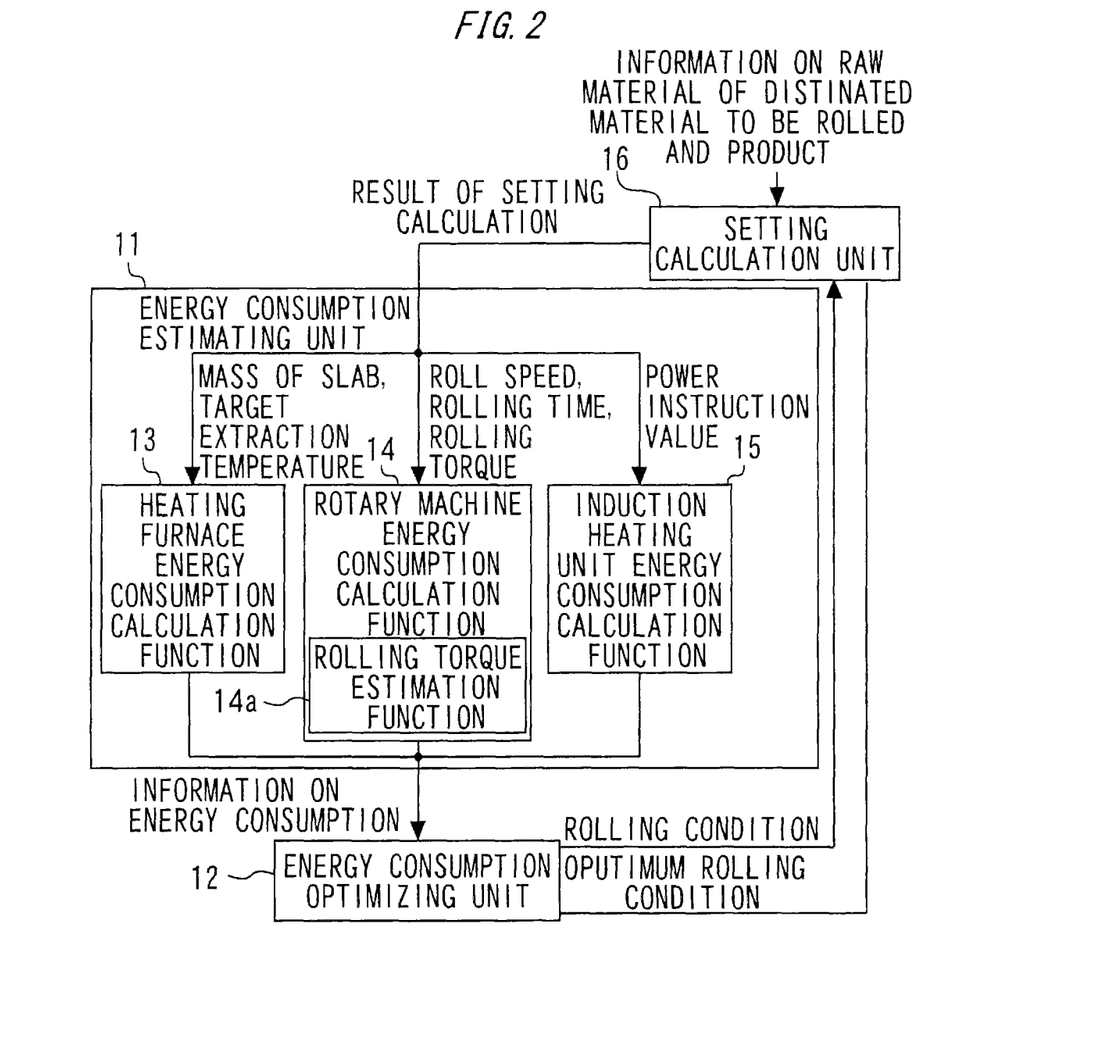
FIG. 2 is a block diagram of the energy-saving control device for a rolling line according to Embodiment 1 of this invention.

FIG. 2 is a block diagram of the energy-saving control device for a rolling line according to Embodiment 1 of this invention.

As illustrated in FIG. 2, the energy-saving control device includes an energy consumption estimating unit 11 and an energy consumption optimizing unit 12. The energy consumption estimating unit 11 includes a heating furnace energy consumption calculation function 13, a rotary machine energy consumption calculation function 14 and an induction heating unit energy consumption calculation function 15. The rotary machine energy consumption calculation function 14 includes a rolling torque estimation function 14a.

The energy consumption estimating unit 11 calculates energy consumption for a hot sheet rolling line, based on results of setting calculations performed by the setting calculation unit 16, using a designated material to be rolled as a calculation subject. For example, as a subject for calculation of energy consumption, a slab, which is to be charged from now in the heating furnace 1, is designated. For example, as a subject for calculation of energy consumption, a slab existing inside heating furnace 1 is designated. For example, as a subject for calculation of energy consumption, a slab to be extracted next from the heating furnace 1 is designated. For example, as a subject for calculation of energy consumption, a product that has already rolled is designated.

Here, the heating furnace energy consumption calculation function 13 calculates energy consumption for making the designated material to be rolled have a desired temperature on the exit side of the heating furnace 1. The rotary machine energy consumption calculation function 14 calculates energy consumption for the rotary machines that drive the mill rolls of the first roughing stand 3a, etc., and rotary machines that drives transportation table rolls (not illustrated). The induction heating unit energy consumption calculation function 15 calculates energy consumption for the bar heater 4 and the edge heater 5.

The energy consumption optimizing unit 12 varies rolling conditions other than a target temperature so that energy consumption for the hot sheet rolling line, which is calculated by the energy consumption estimating unit 11, becomes minimum. Here, if all of the rolling conditions are changed one by one to search for rolling conditions for minimizing energy consumption, a long period of time is required for the calculation. Therefore, the energy consumption optimizing unit 12 searches for a rolling condition that enables efficient reduction of energy consumption. Using the rolling condition as a manipulation item, the energy consumption optimizing unit 12 changes the rolling conditions for the hot sheet rolling line.

Rolling condition change and energy consumption calculation are repeated. As a result, optimum rolling conditions for minimizing energy consumption are calculated. The optimum rolling conditions are sent to the setting calculation unit 16. The setting calculation unit 16 provides initial values corresponding to the optimum rolling conditions to the unit of level 1.

Next, a method for energy consumption calculation by the heating furnace energy consumption calculation function 13 will be described with reference to FIG. 3.

Figure 3:
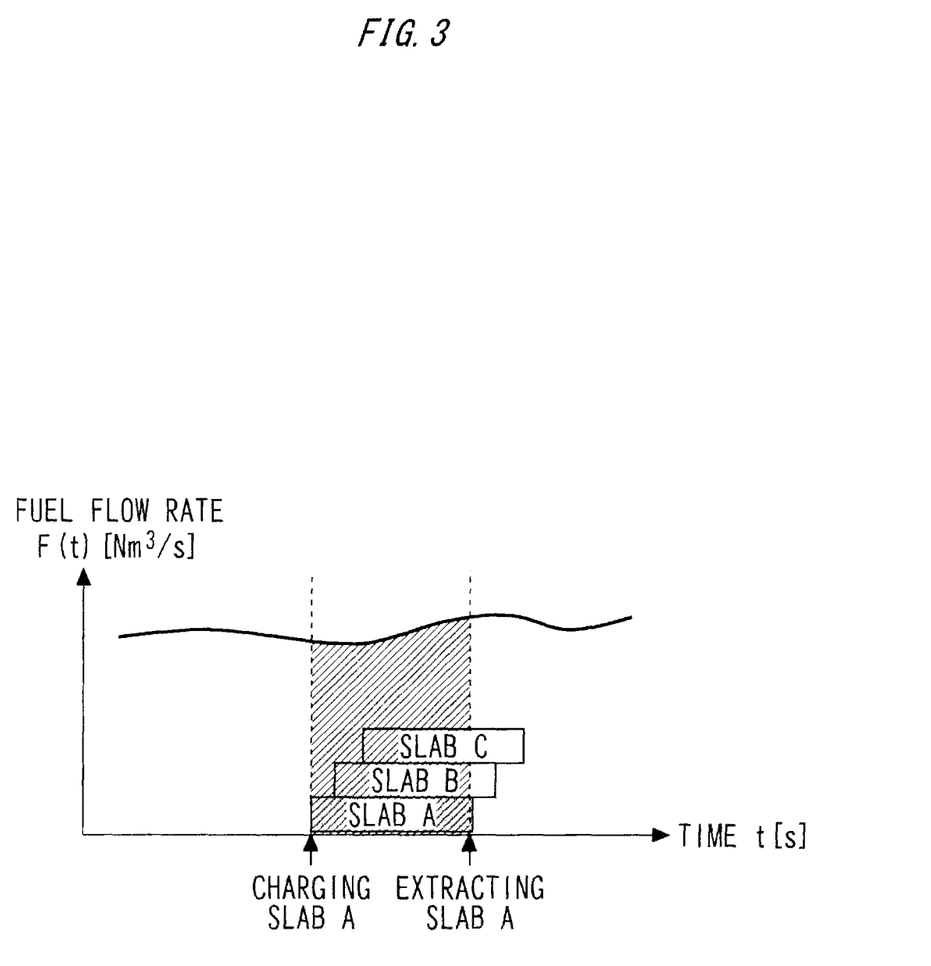
FIG. 3 is a diagram for describing fuel flow rate variation in the heating furnace provided on the hot sheet rolling line using the energy-saving control device for a rolling line according to Embodiment 1 of this invention.

FIG. 3 is a diagram for describing fuel flow rate variation in the heating furnace provided on the hot sheet rolling line using the energy-saving control device for a rolling line according to Embodiment 1 of this invention. The abscissa axis in FIG. 3 is time t (s). The ordinate axis in FIG. 3 is a fuel flow rate F(t) (Nm³/s) as converted to that in reference conditions of 0° C. and 1 atmosphere.

If a designated slab A is one before heating in the heating furnace 1, the heating furnace energy consumption calculation function 13 uses estimated values of a fuel flow rate F(t) based on past records of use of a slab of a steel type and a size that are similar to those of the slab A. If the designated slab A is one that is being heated in the heating furnace 1, the heating furnace energy consumption calculation function 13 uses actual values and the estimated values of the fuel flow rate F(t). If the designated slab A is one extracted from the heating furnace 18, the heating furnace energy consumption calculation function 13 uses actual values of the fuel flow rate F(t).

In FIG. 3, the area of the shaded part corresponds to a total fuel flow rate value $F_{TOTAL}$ (Nm³) when the slab A is being heated. The heating furnace energy consumption calculation function 13 multiplies the total fuel flow rate value $F_{TOTAL}$ by a heat generation efficiency H (kj/Nm³) when a fuel is converted to thermal energy, thereby calculating energy consumption for heating the slab A.

In the heating furnace 1, e.g., a slab B and a slab C are also heated in addition to the slab A. Therefore, the heating furnace energy consumption calculation function 13 calculates energy consumption $E_{RF}$ (kJ) for the heating of the slab A using a ratio of a mass of the slab A to a total value of masses of the slabs existing inside the heating furnace 1.

Here, the slabs A to C and the like are different from one another in charging and extraction timings. Thus, it is assumed that the total value of masses of the slabs is an average mass $W_{AVE}$ (kg) during a period of time of the slab A being heated. In this case, the energy consumption $E_{RF}$ is calculated by Expression (1) below.

$$E_{RF}=H \times F_{TOTAL} \times W/W_{AVE} \tag{1}$$

Next, a method for calculating the average mass $W_{AVE}$ will be described with reference to FIG. 4.

Figure 4:
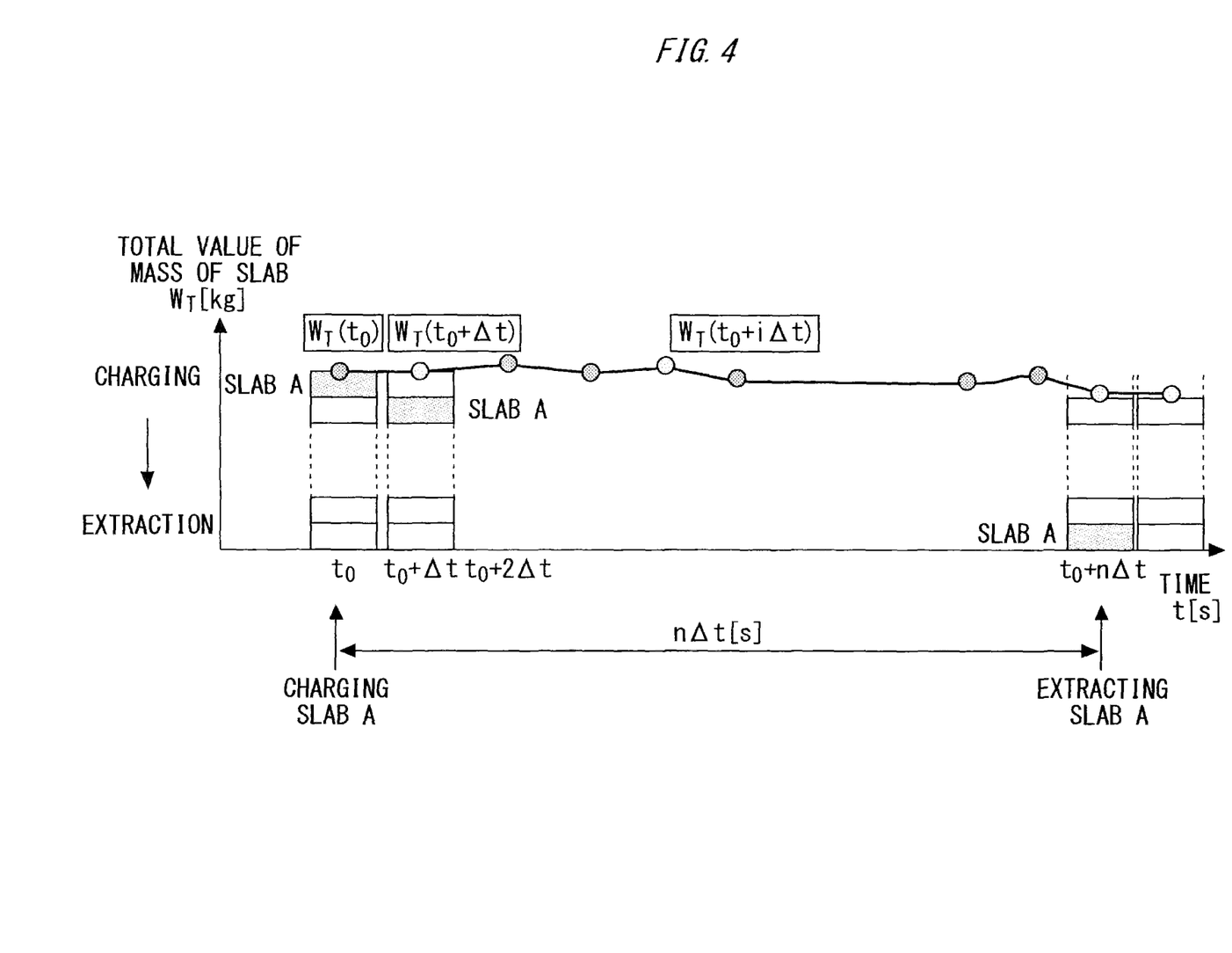
FIG. 4 is a diagram for describing a method for calculating an average mass of a slab using the energy-saving control device for a rolling line according to Embodiment 1 of this invention.

FIG. 4 is a diagram for describing a method for calculating an average mass of a slab using the energy-saving control device for a rolling line according to Embodiment 1 of this invention. The abscissa axis in FIG. 4 represents time t (s). The ordinate axis in FIG. 4 represents a total mass value $W_T(t)$ (kg) of slabs heated inside the heating furnace 1.

In FIG. 4, the heating furnace energy consumption calculation function 13 calculates a total value of the masses of the slabs existing inside heating furnace 1, based on a schedule for slab heating by the heating furnace 1. More specifically, the heating furnace energy consumption calculation function 13 divides time from charging of the slab A to extraction of the same into n times divisions. The heating furnace energy consumption calculation function 13 calculates a total value $W_T(t)$ (kg) of the masses of the slabs existing inside the heating furnace 1 at fixed intervals $\Delta t$ (s) corresponding to the times divisions.

The heating furnace energy consumption calculation function 13 determines a time average of $W_T(t)$ as an average mass $W_{AVE}$. More specifically, the average mass $W_{AVE}$ is calculated according to Expression (2) below.

$$W_{AVE} = \{W_T(t_0) \times \Delta t + W_T(t_0 + \Delta t) \times \Delta t + \ldots + W_T(t_0 + n\Delta t) \times \Delta t\}/(n\Delta t) \quad (2)$$

Next, a method for energy consumption calculation by the rotary machine energy consumption calculation function 14 will be described with reference to FIG. 5.

Figure 5:
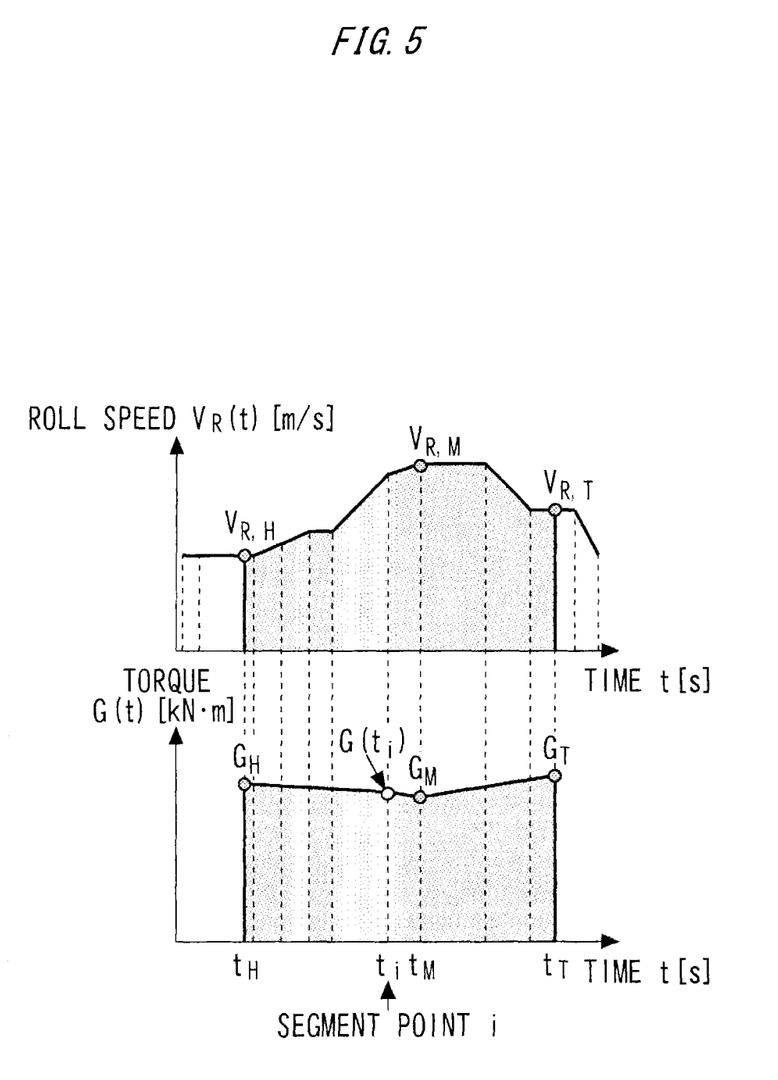
FIG. 5 is a diagram for describing a method for rolling torque calculation by the energy-saving control device for a rolling line according to Embodiment 1 of this invention.

FIG. 5 is a diagram for describing a method for rolling torque calculation by the energy-saving control device for a rolling line according to Embodiment 1 of this invention. The abscissa axis in FIG. 5 represents time t (s). The ordinate axis in the upper part of FIG. 5 represents a rolling velocity $V_R(t)$ (m/s) of, e.g., the first finishing stand 7a. The ordinate axis in the lower part of FIG. 5 represents a rolling torque G(t) (kN·m). Index H corresponds to a head end position of the material to be rolled. Index M corresponds to a middle position of the material to be rolled. Index T corresponds to a tail end position of the material to be rolled.

A rolling velocity largely affects temperature control of a material to be rolled. Thus, the setting calculation unit 16 creates a continuous velocity pattern as detailed prior information. For example, the rolling velocity of the seventh finishing stand 7g is set so that an exit-side temperature of the material to be rolled becomes a target temperature.

More specifically, as illustrated in the upper part of FIG. 5, a rolling velocity $V_{R,H}$ is set to a threading speed so that the material to be rolled is normally drawn in between the mill rolls. A rolling velocity $V_{R,M}$ is set so as to increase after the material to be rolled being drawn in between the mill rolls. A rolling velocity $V_{R,T}$ is set so as to decrease to allow the material to be rolled to be normally drawn out of the mill rolls. Depending on the rolling conditions, the velocity increase setting or the velocity decrease setting may not be made.

In the velocity pattern, a range having a fixed acceleration is regarded as one segment. At each of boundaries of the adjacent segments, a segment point is set. An i-th segment point is indicated by segment point i. In FIG. 5, each segment point is indicated by a vertical dotted line.

The setting calculation unit 16 calculates velocity changes based on the length of the material to be rolled and the velocity pattern. The setting calculation unit 16 calculates a time of each segment based on the velocity changes. The setting calculation unit 16 calculates rolling time by totaling the times of all of the segments.

The rotary machine energy consumption calculation function 14 obtains the velocity pattern and the rolling time from the setting calculation unit 16. Here, the rotary machine energy consumption calculation unit obtains estimated values of rolling torque at positions of the head end, the middle and the tail end of the material to be rolled from the setting calculation unit 16.

Here, the rolling torque estimation function 14a calculates a rolling torque at a time when no estimation calculation is performed. More specifically, the rolling torque estimation function 14a calculates a rolling torque between the head end and the middle of the material to be rolled based on linear interpolation using the estimated values of the rolling torques at the head end and the middle of the material to be rolled. The rolling torque estimation function 14a calculates a rolling torque between the middle and the tail end of the material to be rolled based on linear interpolation using the estimated values of the rolling torques at the middle and the tail end of the material to be rolled.

In this case, at a time $t_i$, which is segment point i, a rolling torque $G(t_i)$ is calculated according to Expressions (3) and (4) below. Here, $t_H$ is a time when the material to be rolled is drawn in between the mill rolls, $t_M$ is a time when acceleration of the mill rolls is completed, and $t_T$ is a time when the material to be rolled is drawn out from the mill rolls.

$$G(t_i) = (G_M - G_H)/(t_M - t_H) \times (t_i - t_H) + G_H \quad (t \leq t_M) \quad (3)$$

$$G(t_i) = (G_T - G_M)/(t_T - t_M) \times (t_i - t_M) + G_M \quad (t \geq t_M) \quad (4)$$

The rotary machine energy consumption calculation function 14 calculates power consumption $P_W(t_i)$ (kW) based on the rolling torque $G(t_i)$, the rolling velocity $V_R(t_i)$ and a roll radius R (m). More specifically, power consumption $P_W(t_i)$ is calculated according to Expression (5) below.

$$P_W(t_i) = G(t_i) \times V_R(t_i)/R \quad (5)$$

The rotary machine energy consumption calculation function 14 calculates energy consumption $E_{MT}$ based on the power consumption $P_W(t_i)$ and the rolling time T. More specifically, the energy consumption $E_{MT}$ (kJ) is calculated according to Expression (6) below.

$$E_{MT} = \int P_W(t_i) dt \quad (6)$$

Energy consumption for each of the second to seventh finishing stands 7b to 7g is also calculated by a method that is similar to the above. Energy consumption for each of the first roughing stand 3a and the second roughing stand 3b is also calculated by a method that is similar to the above.

Next, a method for energy consumption calculation by the induction heating unit energy consumption calculation function 15 will be described with reference to FIG. 6.

Figure 6:
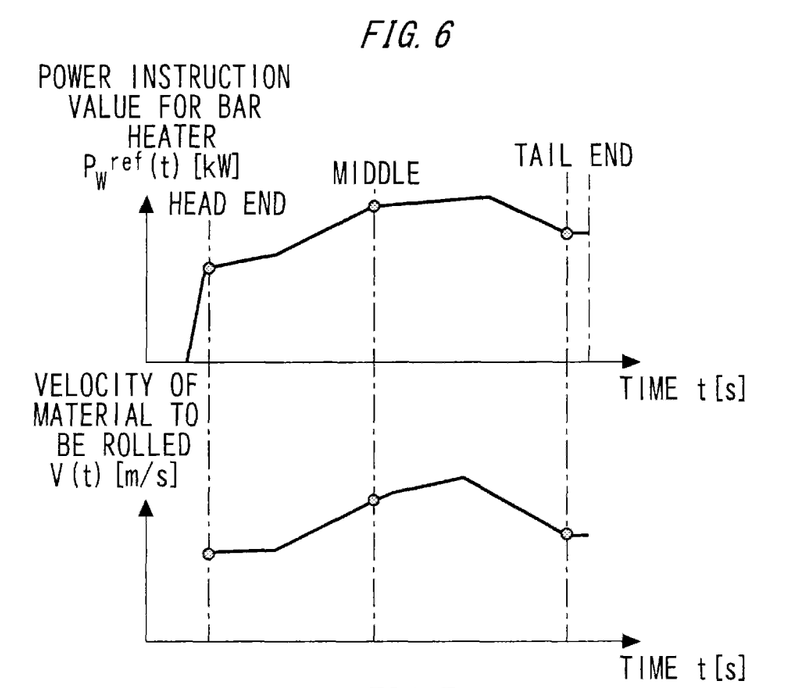
FIG. 6 is a diagram for describing a method for calculation of energy consumption for the bar heater, by the energy-saving control device for a rolling line according to Embodiment 1 of this invention.

FIG. 6 is a diagram for describing a method for calculation of energy consumption for the bar heater, by the energy-saving control device for a rolling line according to Embodiment 1 of this invention. The abscissa axis in FIG. 6 represents time t (s). The ordinate axis in the upper part of FIG. 6 represents a power instruction value $P_W^{ref}(t)$ (kW) for the bar heater 4. The ordinate axis in the lower part of FIG. 6 represents a velocity V(t) (m/s) of the material to be rolled.

The setting calculation unit 16 calculates a power instruction value $P_W^{ref}(t)$ using a function f of the velocity V(t) of the material to be rolled and a temperature increase amount $\Delta T(t)$ (° C.) as variables. More specifically, the power instruction value $P_W^{ref}(t)$ is calculated according to Expression (7) below.

$$P_W^{ref}(t) = f(V(t), \Delta T(t)) \quad (7)$$

In Expression (7), as a value of the velocity V(t) of the material to be rolled is larger, it is necessary to heat the material to be rolled in a shorter period of time. In this case, a value of the power instruction value $P_W^{ref}(t)$ becomes large. As the value of the temperature increase amount $\Delta T(t)$ is larger, the value of the power instruction value $P_W^{ref}(t)$ becomes larger.

For the temperature increase amount $\Delta T(t)$, various patterns can be contemplated. If the temperature of the material to be rolled is increased by a fixed temperature through the entire length thereof, the temperature increase amount $\Delta T(t)$ has a fixed value. On the other hand, where a thermal rundown is compensated, the temperature increase amount $\Delta T(t)$ becomes larger toward the tail end side of the material to be rolled. Also, the value of the temperature increase amount $\Delta T(t)$ may become large locally on the tail end side of the material to be rolled.

In FIG. 6, the temperature increase amount $\Delta T(t)$ has a fixed value. The induction heating unit energy consumption calculation function 15 obtains a power instruction value $P_W^{ref}(t)$ for each of three points, which are the head end, middle and tail end positions of the material to be rolled, from the setting calculation unit 16. For each of positions other than the head end, middle and tail end positions of the material to be rolled, the induction heating unit energy consumption calculation function 15 calculates a power instruction value $P_W^{ref}(t)$ by means of linear approximation.

The induction heating unit energy consumption calculation function 15 performs time-integration of the power instruction value $P_W^{ref}(t)$. Integration time is from a start to an end of heating. As a result of the integration, energy consumption $E_{BH}$(kJ) by the bar heater 4 is calculated. More specifically, the energy consumption $E_{BH}$(kJ) is calculated according to Expression (8) below.

$$E_{BH} = \int P_W^{ref}(t) dt \qquad (8)$$

For the edge heater 5, also, the induction heating unit energy consumption calculation function 15 performs linear approximation for a power instruction value. The induction heating unit energy consumption calculation function 15 performs time-integration of the power instruction value. As a result, energy consumption for the edge heater 5 is calculated.

Next, a finish rolling load ratio change by the energy consumption optimizing unit 12 will be described with reference to FIG. 7.

Figure 7:
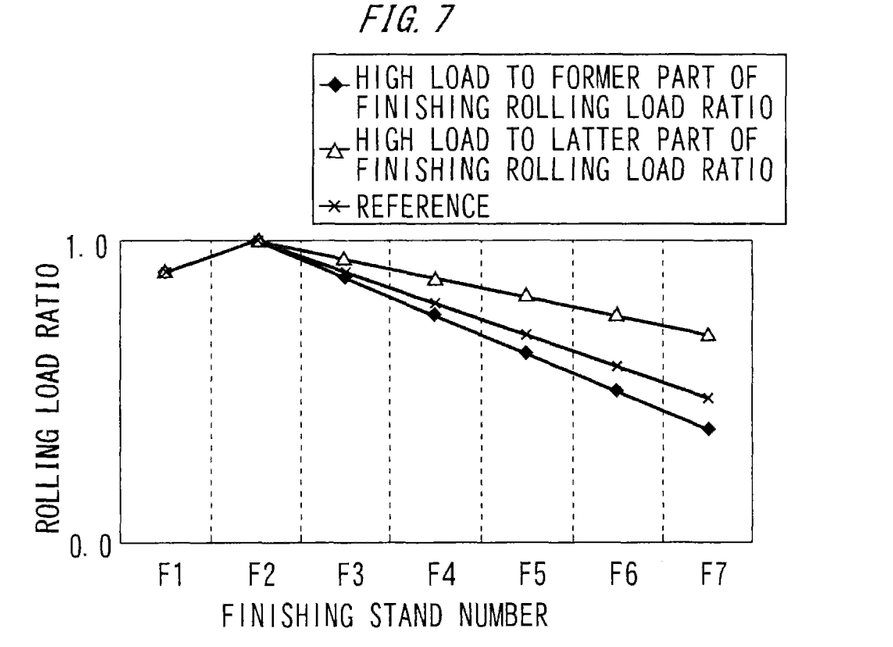
FIG. 7 is a diagram for describing finish rolling load ratio changes by the energy-saving control device for a rolling line according to Embodiment 1 of this invention.

FIG. 7 is a diagram for describing finish rolling load ratio changes by the energy-saving control device for a rolling line according to Embodiment 1 of this invention. The abscissa axis in FIG. 7 represents finishing stand number. The ordinate axis in FIG. 7 represents finish rolling load ratio.

The finish rolling load ratio is standardized with a largest rolling load from among the rolling loads on the first to seventh finishing stands 7a to 7g as 1.0. For example, if the rolling load on the second finishing stand 7b is 20000 (kN) and largest, the rolling load ratio of the second finishing stand 7b is 1.0. If the rolling load on the third finishing stand 7c is 15000 (kN), the rolling load ratio of the third finishing stand 7c is 0.75.

In FIG. 7, the energy consumption optimizing unit 12 changes the finish rolling load ratios of the first to seventh finishing stands 7a to 7g with reference to the finish rolling load ratio of the seventh finishing stand 7g.

Next, energy consumption variations when a thickness of the bar and the finish rolling load ratio are changed will be described with reference to FIG. 8.

Figure 8:
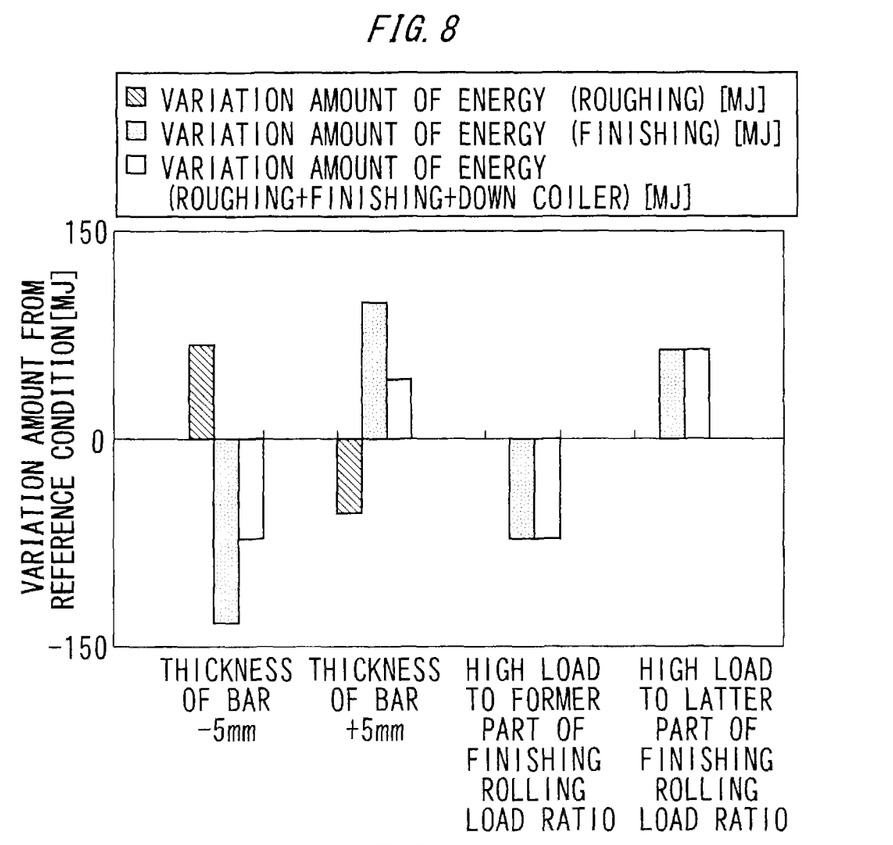
FIG. 8 is a diagram for describing energy consumption variations when a thickness of the bar and finish rolling load ratio allocation are changed by the energy-saving control device for a rolling line according to Embodiment 1 of this invention.

FIG. 8 is a diagram for describing energy consumption variations when a thickness of the bar and finish rolling load ratio allocation are changed by the energy-saving control device for a rolling line according to Embodiment 1 of this invention. The abscissa axis in FIG. 8 represents contents of rolling condition changes. The ordinate axis in FIG. 8 represents a variation amount (MJ) of energy consumption from reference conditions when a bar having a thickness of 45 mm is rolled to a thickness of 3.75 mm.

When the thickness of the bar is reduced by 5 mm, a draft amount increases in each of the first roughing stand 3a and the second roughing stand 3b. As a result of the increase, the rolling torque also increases. As a result of the increase, the energy consumption for each of the first roughing stand 3a and the second roughing stand 3b also increases. On the other hand, draft amounts of the first to seventh finishing stands 7a to 7g decrease. As a result of the decrease, the rolling torque also decreases. As a result of the decrease, energy consumption for each of the first to seventh finishing stands 7a to 7g also decreases. An amount of the decrease in energy consumption for the first to seventh finishing stands 7a to 7g exceeds an amount of the increase in energy consumption for the first roughing stand 3a and the second roughing stand 3b. Thus, a total of the energy consumption for the first roughing stand 3a, the second roughing stand 3b and the first to seventh finishing stands 7a to 7g decreases.

If the thickness of the bar is increased by 5 mm, the draft amount decreases in each of the first roughing stand 3a and the second roughing stand 3b. As a result of the decrease, the rolling torque also decreases. As a result of the decrease, the energy consumption for each of the first roughing stand 3a and the second roughing stand 3b also decreases. On the other hand, the draft amount in each of the first to seventh finishing stands 7a to 7g increases. As a result of the increase, the rolling torque also increases. As a result of the increase, the energy consumption for each of the first to seventh finishing stands 7a to 7g also increases. An amount of the increase in energy consumption for the first to seventh finishing stands 7a to 7g exceeds an amount of the decrease in energy consumption for the first roughing stand 3a and the second roughing stand 3b. Thus, a total of the energy consumption for the first roughing stand 3a, the second roughing stand 3b and the first to seventh finishing stands 7a to 7g increases.

No finish rolling load ratio allocation change affects rolling at the first roughing stand 3a and the second roughing stand 3b. Thus, an amount of energy consumption variation in the first roughing stand 3a and the second roughing stand 3b is 0.

In FIG. 8, in comparison with variation in energy consumption for the upstream-side finishing stands, variation in energy consumption for the downstream-side finishing stands is large. Thus, under a condition that a high load is imposed on the upstream-side finishing stands, the energy consumption for the first to seventh finishing stands 7a to 7g decreases.

Next, a method for searching for a manipulation item by the energy consumption optimizing unit 12 will be described with reference to FIG. 9.

Figure 9:
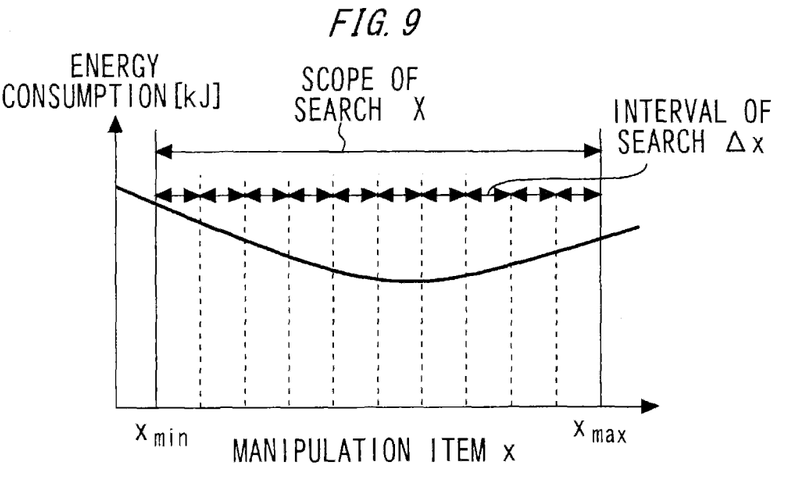
FIG. 9 is a diagram for describing a method for searching for a manipulation item by the energy-saving control device for a rolling line according to Embodiment 1 of this invention.

FIG. 9 is a diagram for describing a method for searching for a manipulation item by the energy-saving control device for a rolling line according to Embodiment 1 of this invention. The abscissa axis in FIG. 9 represents a manipulation item x. The ordinate axis in FIG. 9 represents energy consumption (kJ).

The manipulation item x may be, e.g., any of the draft amount allocations for the first roughing stand 3a and the second roughing stand 3b, the thickness of the bar, the finish rolling load ratio allocations for the first to seventh finishing stands 7a to 7g and the flow rates of the first to sixth cooling sprays 8a to 8f. If the manipulation item x is changed, the rolling conditions for the hot sheet rolling line vary. As a result, energy consumption for the entire hot sheet rolling line varies.

For example, if the draft amount in the first roughing stand 3a is made to be larger than the draft amount in the second roughing stand 3b, the energy consumption decreases. For example, if a high load is imposed on the upstream-side finishing stands, the energy consumption decreases. If the flow rates of the cooling sprays are increased, the energy consumption decreases.

However, in actual operation of the hot sheet rolling line, various restrictive conditions are set. For example, for using the crop shear 6 safely, an upper limit of the thickness of the bar and an upper limit of the length of the bar are set. For example, for stable threading to the first to seventh finishing stands 7a to 7g, upper and lower limits of the threading speed are set. Because of mechanical restrictions in the first to seventh finishing stands 7a to 7g, upper and lower limits of load are set.

In FIG. 8, no restrictive conditions are taken into account. Thus, energy consumption may fail to monotonously vary. Therefore, the energy consumption optimizing unit 12 determines a search range X taking the restrictive conditions into account.

The energy consumption optimizing unit 12 calculates a degree of an impact provided by each rolling condition on energy consumption as an impact degree I. The impact degree I is calculated according to Expression (9) below.

$$I=|E(x_{max})-E(x_{min})| \tag{9}$$

Here, E(x) is energy consumption under a rolling condition x. If a search range X is provided, $x \subset X$. Here, $x_{max}$ is a maximum value in the search range X, and $x_{min}$ is a minimum value in the search range X.

Subsequently, the energy consumption optimizing unit 12 determines a rolling condition having a largest impact degree I as a manipulation item x, and varies the rolling condition at fixed search intervals Δx in the search range X. For example, if the manipulation item x is the thickness of the bar, the search range X is, e.g., ±5 mm from a preset thickness of the bar. The search intervals Δx are around 1 mm.

The energy consumption optimizing unit 12 stores the energy consumptions when the manipulation item x is varied every search interval Δx. The energy consumption optimizing unit 12 stores a manipulation item x providing smallest energy consumption as an optimum solution.

Here, depending on the rolling condition, a plurality of minimal values may exist. In this case, if the search intervals Δx are large, an accurate optimum solution cannot be obtained. Therefore, the search intervals Δx are made to be small, whereby an accurate optimum solution can be obtained.

On the other hand, if the search intervals Δx are small, calculation time for the energy consumption optimizing unit 12 increases. Thus, an optimization method such as a steepest descent method, Newton's method or particle swarm optimization may be used. In this case, an accurate optimum solution can be obtained in a short period of time.

Also, a plurality of rolling conditions each having a large impact degree I may be selected as manipulation items x. For example, if the thickness of the bar and the finish rolling load ratio allocation are selected as manipulation items x, the thickness of the bar and the finish rolling load ratio allocation are varied at fixed intervals to search for a combination of rolling conditions providing smallest energy consumption.

Next, a procedure for optimizing rolling conditions will be described with reference to FIG. 10.

Figure 10:
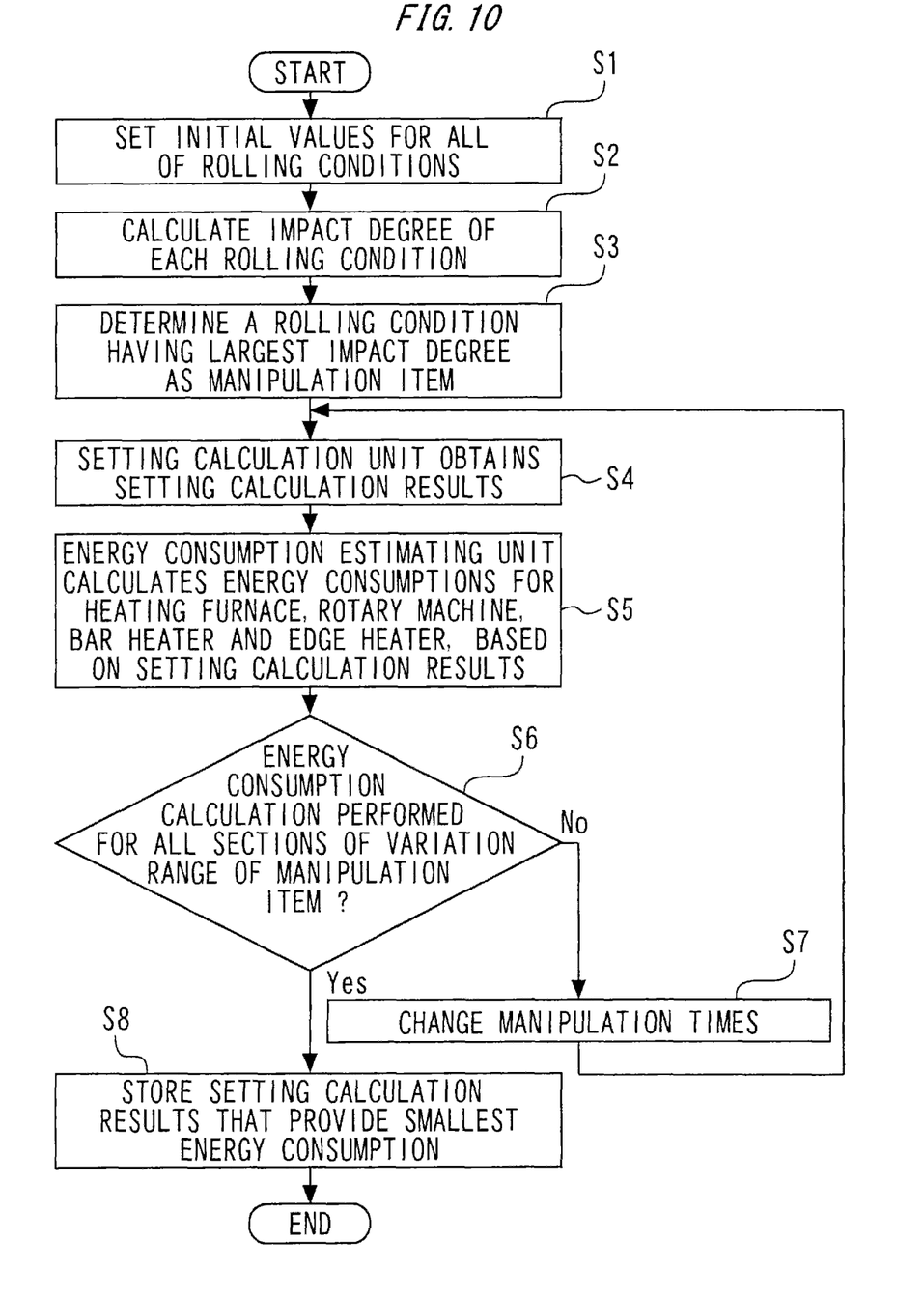
FIG. 10 is a flowchart for describing a procedure for optimizing rolling conditions via the energy-saving control device for a rolling line according to Embodiment 1 of this invention.

FIG. 10 is a flowchart for describing a procedure for optimizing rolling conditions via the energy-saving control device for a rolling line according to Embodiment 1 of this invention.

In step S1, the setting calculation unit 16 sets initial values for all of the rolling conditions in order to achieve instruction values such as target product quality, sheet thickness and sheet width provided as product specifications. Subsequently, the procedure proceeds to step S2, and the energy consumption optimizing unit 12 calculates an impact degree of each rolling condition. Subsequently, the procedure proceeds to step S3, and the energy consumption optimizing unit 12 determines a rolling condition having a largest impact degree as a manipulation item.

Subsequently, the procedure proceeds to step S4, and the setting calculation unit 16 obtains results of setting calculations when the manipulation item is varied. Subsequently, the procedure proceeds to step S5, and the energy consumption estimating unit 11 calculates energy consumptions for the heating furnace 1, the rotary machine, the bar heater 4 and the edge heater 5 based on the setting calculation results. Subsequently, the procedure proceeds to step S6, and the energy consumption optimizing unit 12 determines whether or not energy consumption calculation has been performed for all sections of the entire variation range of the manipulation item.

In step S6, if energy consumption calculation has not been performed for all sections of the change range of the manipulation item, the procedure proceeds to step S7. In step S7, the energy consumption optimizing unit 12 changes manipulation items. Subsequently, the procedure returns to step S4.

In step S6, if energy consumption calculation has been performed for all sections of the change range of the manipulation item, the procedure proceeds to step S8. In step S8, the energy consumption optimizing unit 12 stores setting calculation results providing smallest energy consumption.

According to Embodiment 1 described above, the energy consumption optimizing unit 12 determines a rolling condition other than a target temperature of a material to be rolled as a manipulation item. Thus, rolling conditions for minimizing energy consumption for a hot sheet rolling line while ensuring a quality of a product can be found.

Also, the setting calculation unit 16 sets rolling conditions for minimizing energy consumption for a hot sheet rolling line when the energy consumption optimizing unit 12 varies a manipulation item. Thus, energy consumption for the hot sheet rolling line can actually be reduced.

Also, the energy consumption optimizing unit 12 determines a rolling condition providing a largest difference between energy consumptions calculated using an upper limit value and a lower limit value in a variation-allowed range, as a manipulation item. Thus, a rolling condition for reducing energy consumption can efficiently be searched for.

Also, the energy consumption estimating unit 11 calculates energy consumption for each of the heating furnace 1, the rotary machine, the bar heater 4 and the edge heater 5 on the hot sheet rolling line. Thus, rolling conditions can be examined taking energy consumption in the entire hot sheet rolling line into account.

Also, the heating furnace energy consumption calculation function 13 calculates energy consumption when heating a material to be rolled, based on estimated values or actual values of a flow rate of a fuel provided to the heating furnace 1. Thus, energy consumption for the heating furnace 1 can properly be calculated according to a designated material to be rolled.

Also, the rolling torque estimation function 14a calculates a rolling torque for a position other than the head end position, the middle position and the tail end position of the material to be rolled, by means of linear interpolation. Thus, predictive calculation of rolling torque can be performed with good accuracy and small calculation load.

Also, in some cases, the heating furnace 1 is not provided. In such cases, the heating furnace energy consumption calculation function 13 is not required.

Also, in some cases, the bar heater 4 and the edge heater 5 are not provided. In such cases, the induction heating unit energy consumption calculation function 15 is not required.

Also, in some cases, an induction heating unit other than the bar heater 4 and the edge heater 5 is provided. For example, a slab heater may be provided. In such cases, the induction heating unit energy consumption calculation function 15 may calculate energy consumption for the induction heating unit.

Also, in some cases, the setting calculation unit 16 may calculate a rolling torque only for a head end position or a middle position of a material to be rolled. In some cases, the setting calculation unit 16 may calculate a rolling torque for a position other than a head end position, a middle position and a tail end position of a material to be rolled. In such cases, also, the rolling torque estimation function 14a may calculate a rolling torque for another position of the material to be rolled based on linear interpolation using rolling torques calculated by the setting calculation unit 16.

Also, in some cases, the setting calculation unit 16 may calculate a rolling velocity only for several positions such as a head end position, a middle position and a tail end position of a material to be rolled. In such cases, the rotary machine energy consumption calculation function 14 may calculate a rolling velocity of another position in the material to be rolled, based on linear interpolation using rolling velocities calculated by the setting calculation unit 16.

Embodiment 2

Figure 11:
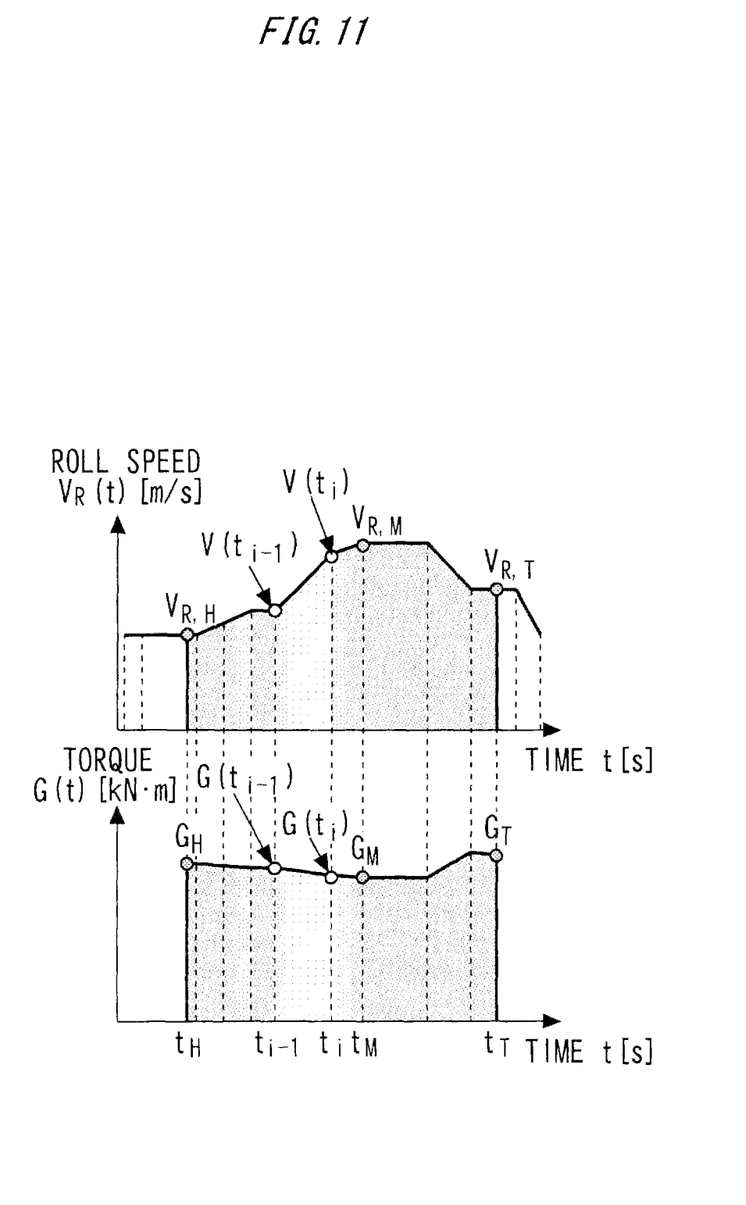
FIG. 11 is a diagram for describing a method for rolling torque calculation by an energy-saving control device for a rolling line according to Embodiment 2 of this invention.

FIG. 11 is a diagram for describing a method for rolling torque calculation by an energy-saving control device for a rolling line according to Embodiment 2 of this invention. Here, parts that are the same as or correspond to those of Embodiment 1 are provided with reference numerals that are the same as those of Embodiment 1 and description thereof will be omitted.

The rotary machine energy consumption calculation function 14 in Embodiment 1 calculates a rolling torque $G(t_i)$ by means of linear interpolation. On the other hand, a rotary machine energy consumption calculation function 14 in Embodiment 2 calculates a rolling torque $G(t_i)$ using a rolling velocity $V_R(t_i)$.

A rolling torque is calculated based on a rolling load and a torque arm. A rolling load varies during rolling. A rolling load is calculated according to Expression (10) below.

Rolling load (kN)=deformation resistance (MPa)× contact arc length (mm)×sheet width (m)×draft function (−) (10)

For example, for each of first to seventh finishing stands 7a to 7g, a rolling velocity is adjusted so that an exit-side temperature becomes a target temperature. As a result of the adjustment, a temperature and a strain rate of the material to be rolled vary. Even if the strain rate varies, a deformation resistance does not vary much. On the other hand, if a temperature of a material to be rolled varies, a deformation resistance varies.

More specifically, if a rolling velocity is increased, a temperature of a material to be rolled increases. As a result of the increase, a deformation resistance is reduced. As a result, a rolling torque is reduced. If a rolling velocity is decreased, a temperature of a material to be rolled decreases. As a result of the decrease, a deformation resistance become large. As a result, a rolling torque becomes large.

Based on such relationships, the rotary machine energy consumption calculation function 14 calculates a rolling torque $G(t_i)$. More specifically, the rolling torque $G(t_i)$ is calculated according to Expressions (11) and (12) below. Here, $V_R(t_i)$ represents a rolling velocity at a time $t_i$.

$$G(t_i)=\{V_R(t_i)-V_R(t_i-1)\}/(V_{R,M}-V_{R,H})\times(G_M-G_H)+G \\ (t_i-1)(t \le t_M) \quad (11)$$

$$G(t_i)=\{V_R(t_i)-V_R(t_i-1)\}/(V_{R,T}-V_{R,M})\times(G^T-G_M)+G(t_i- \\ 1)(t \ge t_M) \quad (12)$$

Assuming that a segment point of a timing after a material to be rolled is drawn in between mill rolls is i−1, the rolling torque $G(t_{i-1})$ is $G_H$. In this case, the rolling torque $G(t_i)$ is calculated according to Expression (11). Using the value of $G(t_i)$, a rolling torque at a following segment point can be calculated. The rotary machine energy consumption calculation function 14 repeats such calculation using Expressions (11) and (12). As a result, a rolling torque at each of all of segment points during rolling can be calculated.

According to Embodiment 2 described above, the rotary machine energy consumption calculation function 14 calculates a rolling torque using a rolling velocity. Thus, energy consumption for a rotary machine can be calculated with higher accuracy.

Embodiment 3

Figure 12:
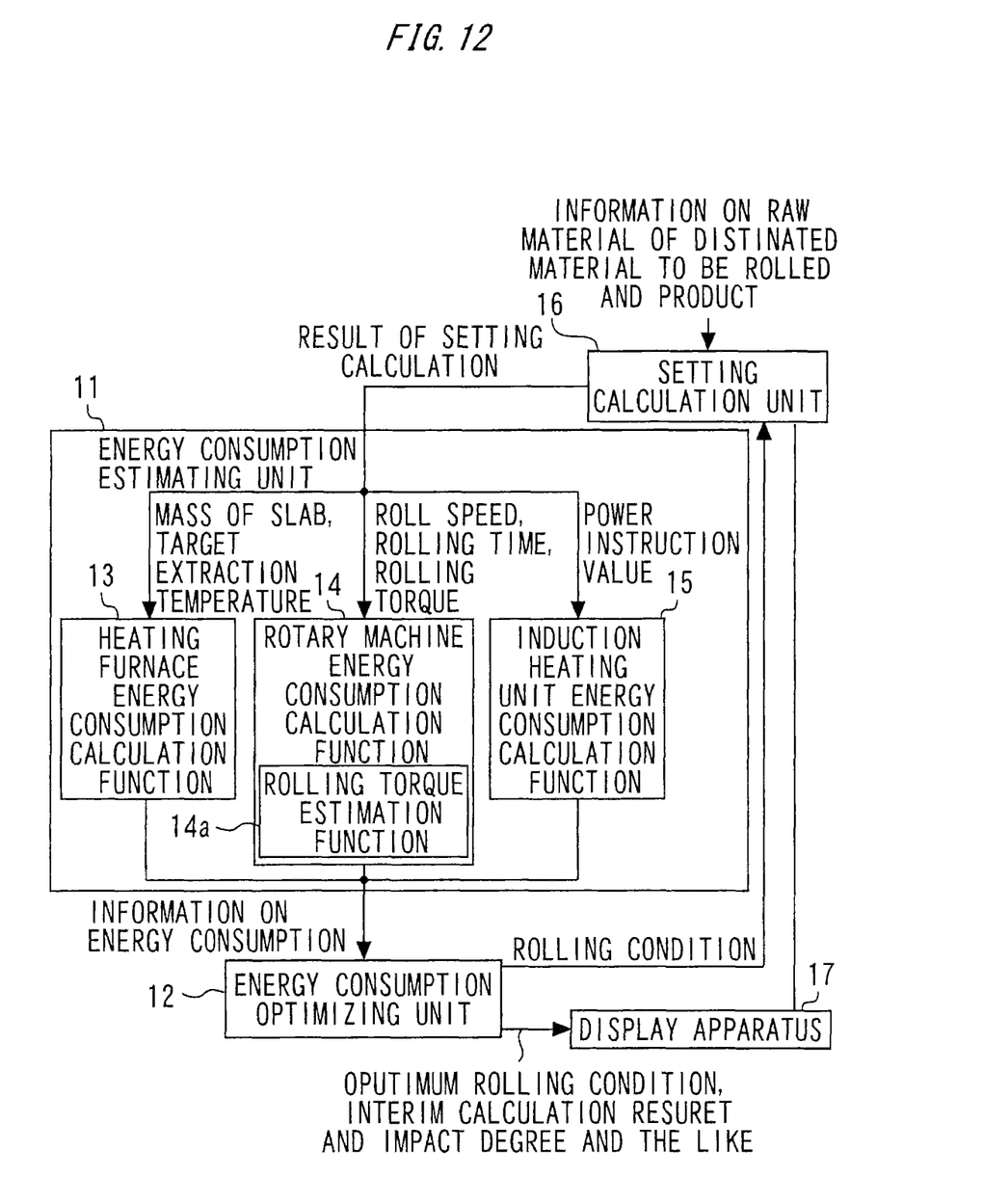
FIG. 12 is a block diagram of an energy-saving control device for a rolling line according to Embodiment 3 of this invention.

FIG. 12 is a block diagram of an energy-saving control device for a rolling line according to Embodiment 3 of this invention. Parts that are the same as or correspond to those of Embodiment 1 are provided with reference numerals that are the same as those of Embodiment 1 and description thereof will be omitted.

Optimum rolling conditions in Embodiment 1 are automatically set by the setting calculation unit 16. On the other hand, optimum rolling conditions in the third embodiment are displayed on a display apparatus 17. The display apparatus 17 displays, e.g., interim calculation results and impact degrees I until optimum rolling conditions are obtained.

According to Embodiment 3 described above, the display apparatus 17 displays, e.g., optimum rolling conditions, interim calculation results and impact degrees I. Thus, an operator can view the display and flexibly change the rolling conditions.

An energy-saving control device according to any of Embodiments 1 to 3 may be applied to any of metal material rolling lines other than hot sheet rolling lines, such as plate rolling lines, cold rolling lines, shaped steel rolling lines, steel bar or wire rod rolling lines, aluminum or copper plate rolling lines and aluminum or copper wire rod rolling lines.

INDUSTRIAL APPLICABILITY

As described above, an energy-saving control device for a rolling line according to this invention can be used for a rolling system that reduces energy consumption for a rolling line while ensuring a product quality.

DESCRIPTION OF SYMBOLS

1 heating furnace, 2a first edger, 2b second edger, 3a first roughing stand, 3b second roughing stand, 4 bar heater, 5 edge heater, 6 crop shear, 7a to 7g first to seventh finishing stands, 8a to 8g first to sixth cooling sprays, 9 run-out table, 10 down coiler, 11 energy consumption estimating unit, 12 energy consumption optimizing unit, 13 heating furnace energy consumption calculation function, 14 rotary machine energy consumption calculation function, 14a rolling torque estimation function, 15 induction heating unit energy consumption calculation function, 16 setting calculation unit, 17 display apparatus

The invention claimed is:

1. An energy-saving control device for a rolling line, the energy-saving control device comprising:
    an energy consumption estimating unit that calculates energy consumption for the rolling line based on rolling conditions for the rolling line, the rolling conditions being parameters that are functions of time, and the calculated energy consumption spanning a rolling period of a material to be rolled, during which one or more values of the rolling conditions change; and
    an energy consumption optimizing unit that determines energy-saving rolling conditions based on minimizing the calculated energy consumption by changing the respective functions of time of one or more of the rolling conditions without changing a target temperature of the material to be rolled, and the target temperature being selected to ensure a quality of the material after being rolled using the rolling line, wherein
    the energy consumption optimizing unit determines the energy-saving rolling conditions that minimize the calculated energy consumption by selecting, within a variation-allowed range, the one or more of the rolling conditions to include a rolling condition of the rolling conditions that provides a largest difference between an energy consumption calculated using an upper limit value of the variation-allowed range in a variation-allowed range and an energy consumption calculated using a lower limit value of the variation-allowed range.

2. The energy-saving control device for a rolling line according to claim 1, comprising a setting calculation unit that sets the rolling conditions for the rolling line to the determined energy-saving rolling conditions that minimize the calculated energy consumption.

3. The energy-saving control device for a rolling line according to claim 1, comprising a display apparatus that displays the determined energy-saving rolling conditions that minimize the calculated energy consumption.

4. The energy-saving control device for a rolling line according to claim 3, wherein the display apparatus displays
    an interim calculation result until the energy-saving rolling conditions that minimize the calculated energy consumption for the rolling line are obtained, and
    a difference in energy consumption for the rolling line, the difference being calculated using an upper limit value and a lower limit value in a variation-allowed range for each rolling condition.

5. The energy-saving control device for a rolling line according to claim 1, wherein the energy consumption estimating unit includes:
    a heating furnace energy consumption calculation function that calculates energy consumption for a heating furnace on the rolling line;
    a rotary machine energy calculation function that calculates energy consumption for a rotary machine on the rolling line; and
    an induction heating unit energy consumption calculation function that calculates energy consumption for an induction heating unit on the rolling line.

6. The energy-saving control device for a rolling line according to claim 5, wherein the heating furnace energy consumption calculation function calculates energy consumption for heating the material to be rolled, based on an estimated value or an actual value of a flow rate of a fuel provided into the heating furnace.

7. The energy-saving control device for a rolling line according to claim 5, wherein the rotary machine energy consumption calculation function
    obtains setting values for a rolling velocity, rolling time, and a first part of rolling torque from the setting calculation unit,
    performs linear interpolation on the first part of rolling torque to obtain a total rolling torque, and
    calculates the energy consumption for the rotary machine based on the total rolling torque obtained by the linear interpolation, the rolling velocity, and the rolling time.

8. The energy-saving control device for a rolling line according to claim 5, wherein the rotary machine energy consumption rotation function
    obtains setting values for a rolling velocity, rolling time, and a first part of rolling torque from the setting calculation unit,
    calculates a remaining part of rolling torque other than the first part of the rolling torque using the setting values for the rolling velocity and the first part of the rolling torque, and
    calculates the energy consumption for the rotary machine based on the remaining part of rolling torque, the rolling velocity, and the rolling time.

9. An energy-saving control method for a rolling line, the method comprising:
    calculating energy consumption for the rolling line based on rolling conditions for the rolling line, the rolling conditions being parameters that are functions of time, and the calculated energy consumption spanning a rolling period of a material to be rolled, during which one or more values of the rolling conditions change; and
    determining energy-saving rolling conditions based on minimizing the calculated energy consumption by changing the respective functions of time of one or more of the rolling conditions without changing a target temperature of the material to be rolled, and the target temperature being selected to ensure a quality of the material after being rolled using the rolling line, wherein
    the energy consumption optimizing unit determines the energy-saving rolling conditions that minimize the calculated energy consumption by selecting, within a variation-allowed range, the one or more of the rolling conditions to include a rolling condition of the rolling conditions that provides a largest difference between an energy consumption calculated using an upper limit value of the variation-allowed range in a variation-allowed range and an energy consumption calculated using a lower limit value of the variation-allowed range.

* * * * *